United States Patent [19]

Paradis et al.

[11] 4,286,628
[45] Sep. 1, 1981

[54] CONTROL OF FLUID FLOW USING LONGITUDINALLY MOVABLE DISC

[75] Inventors: Joseph R. Paradis, Holden; Edward W. Kaleskas, Jefferson, both of Mass.

[73] Assignee: Nypro, Inc., Clinton, Mass.

[21] Appl. No.: 50,823

[22] Filed: Jun. 21, 1979

[51] Int. Cl.³ .................................................. F16K 15/14
[52] U.S. Cl. .................................................. 137/843
[58] Field of Search ............... 137/512.15, 843, 854, 137/860, 533.17, 533.19, 543.19, 519

[56] References Cited

U.S. PATENT DOCUMENTS

| | | | |
|---|---|---|---|
| 2,223,944 | 12/1940 | Roy | 137/543.19 |
| 3,807,445 | 4/1974 | McPhee | 137/843 X |
| 3,889,710 | 6/1975 | Brost | 137/843 X |
| 3,954,121 | 5/1976 | Kardos | 137/854 |
| 4,141,379 | 2/1979 | Manske | 137/859 X |

Primary Examiner—William R. Cline
Attorney, Agent, or Firm—George E. Kersey

[57] ABSTRACT

Apparatus for the control of fluid flow using a flexible disc that is positioned in a control channel and restricted to movement along the longitudinal axis of the channel. This avoids the disadvantages of variable positionable discs, while retaining their advantages. Closure control is exercised by moving the disc into closer contact with a ring seat that is essentially self-purging of debris. Since the disc is confined to essentially longitudinal movement, distortion due to random lateral movement is avoided.

11 Claims, 6 Drawing Figures

CONTROL OF FLUID FLOW USING LONGITUDINALLY MOVABLE DISC

BACKGROUND OF THE INVENTION

This invention relates to flow control, and, more particularly, to the control of fluid flow making use of pressure differentials.

In many situations it is necessary to control the flow of fluids, such as liquids and gases. A common device for that purpose is known as a check valve. It functions by the deflection of an elastomeric element towards a valve seat in order to prevent flow and away from the seat to permit flow.

One such device is the check valve disclosed in U.S. Pat. 3,889,710 which issued to Julien H. Brost on June 17, 1975. It contains an elastomeric disc that is deflected towards and away from a concave seating surface that surrounds an inlet. The disc is deliberately made smaller than the seating surface. This is to permit reverse flow around the edges of the disc.

Unfortunately, the use of a concave seating surface with a floatable disc, i.e. one that is smaller than the seating surface, causes a number of difficulties. In the first place a valve with a concave seating surface is susceptable to malfunction because inevitable particles of debris that become trapped between the disc and its concave seat. Once debris becomes trapped it tends to remain on the seat during subsequent operations of the valve. In addition since the disc is smaller than its seat it tends to move about with the result that different portions of the surface become stressed during subsequent operations. Furthermore, there is an undesirable tendency for a portion of the disc to be drawn into the associated inlet during closure operation of the valve.

Other known valves for controlling flow are those illustrated by the following patents:

| Patent No. | Issued | Inventor |
| --- | --- | --- |
| 797,739 | 8/1905 | Meer |
| 1,412,473 | 4/1922 | Lane |
| 1,506,012 | 8/1924 | Lewis |
| 2,547,377 | 4/1951 | Juhasz |
| 3,247,866 | 4/1966 | Sanz |
| 3,664,371 | 5/1972 | Schneider |

Accordingly, it is an object of the invention to facilitate the control of fluid flow. A related object is to facilitate the control of fluid flow using differential pressures.

A further object of the invention is to overcome the difficulties associated with prior check valves. A related object is to avoid the difficulties associated with a single disc check valves.

Still another object of the invention is to avoid the difficulties associated with "floatable" disc. A related object is to avoid the difficulties associated with discs that are smaller than their associated seats. Another related object is to avoid the random wear pattern associated with "floatable" discs.

Yet another object of the invention is to reduce disc distortion in check valves. A related object is to reduce the tendency for a disc to be drawn into a flow channel and produce disc distortion.

A yet further object of the invention is to facilitate the seating action of a valve disc and render the valve substantially self purging of debris, such as dirt and dust, that could otherwise interfere with the seating operation.

SUMMARY OF THE INVENTION

In accomplishing the foregoing and related objects, the invention provides for the exercise of flow control using a resiliant and flexible disc which is restricted to movement along the longitudinal axis of a control channel. This avoids the disadvantages of variable positionable discs, while retaining their advantages.

In accordance with one aspect of the invention the disc is symmetrically positioned with respect to the control channel to assure uniform performance of the disc during opening and closure operations.

In accordance with another aspect of the invention, the disc has a ring seat with rounded, convex shoulders that facilitate seating during initial preloading of the disc, and facilitate the self-purging of debris from the seat.

In accordance with still another aspect of the invention, the entrance of the flow channel is a base depression surrounded by the ring seat. This helps assure that the disc is securely seated when the valve is fully closed.

In accordance with yet another aspect of the invention, the base depression of the ring seat includes radial channels that limit the tendency for the disc to be drawn into the flow channel.

According to a further aspect of the invention, the control channel includes peripheral grooves for the flow of fluid during the open condition of the valve.

According to a still further aspect of the invention, the disc is prestressed by a member with auxiliary flow channels for accommodating the reverse flow of fluid through the valve. The latter channels are desirably symmetrically, laterally and radially positioned with respect to a main flow channel.

DESCRIPTION OF THE DRAWINGS

Other aspects of the invention will become apparent after considering several illustrative embodiments taken in conjunction with the drawings in which.

DETAILED DESCRIPTION

Figure 1:
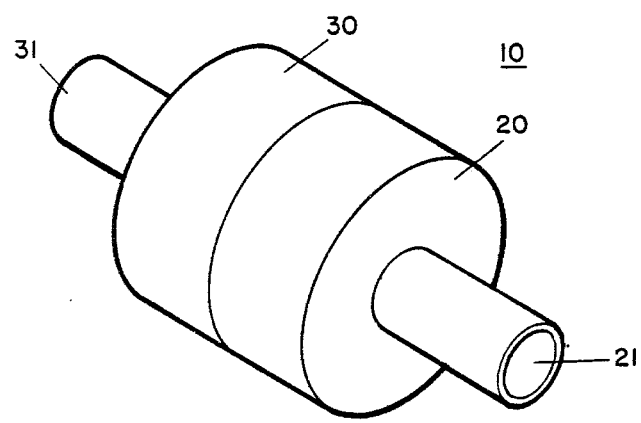
FIG. 1 is a perspective view of a control valve in accordance with the invention.

With reference to the drawings, an illustrative control valve 10 in accordance with the invention is shown in FIG. 1.

Figure 2:
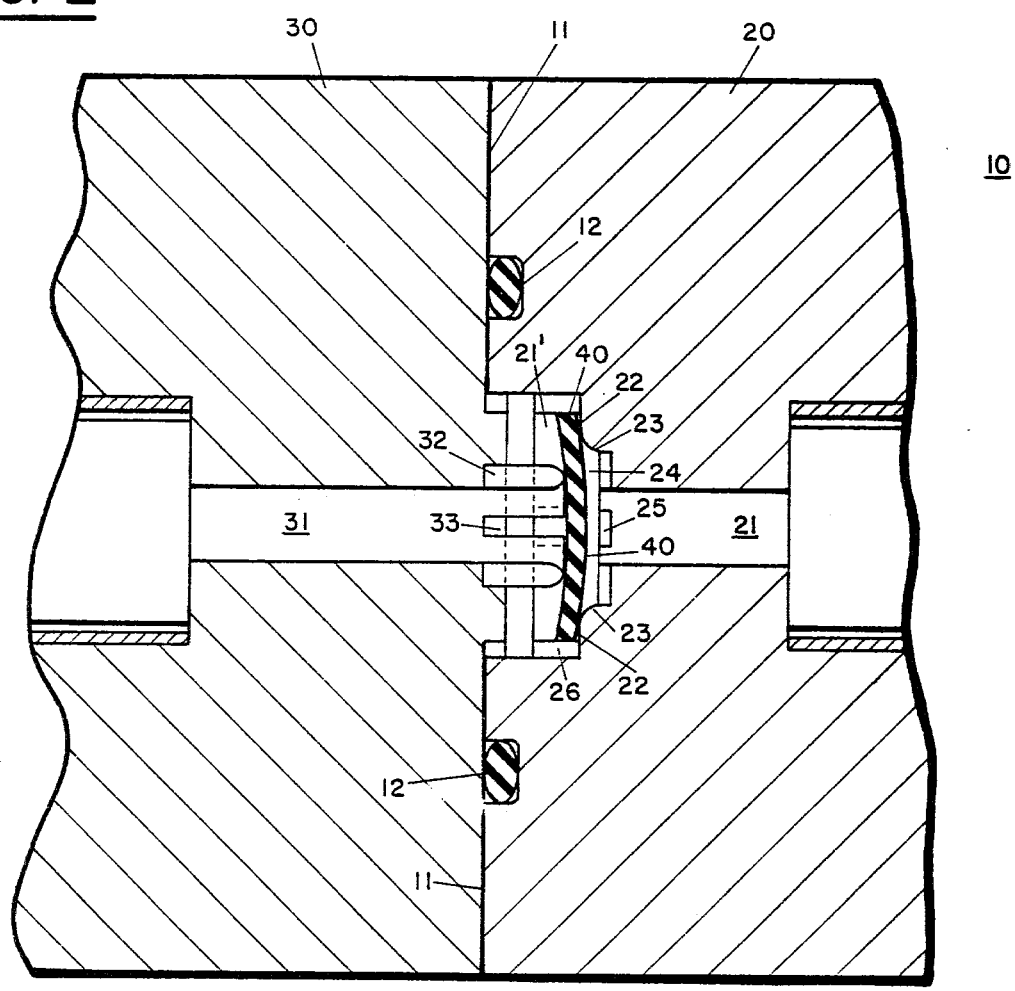
FIG. 2 is a fragmentary cross-sectional view of the control valve of FIG. 1.

The control valve 10 is formed by complementary body members 20 and 30 forming a housing with flow channels 21 and 31 that are controlled by a flexible, elastomeric control disc 40, as shown in the cross-sectional view of FIG. 2.

The control disc 40 is positioned within a control channel 21' of a body member 20. By contrast with the prior art, the disc 40 has substantially the same circumferential diameter as the channel 21'. As a result there is substantially no lateral movement of the disc 40 with respect to the channel 21'.

As further indicated in FIG. 2, the disc 40 is seated on the flange surface of a ring seat 22. The ring 22 has a hollow interior with a convex shoulder 23 to promote secure sealing in accordance with the invention.

Figure 3:
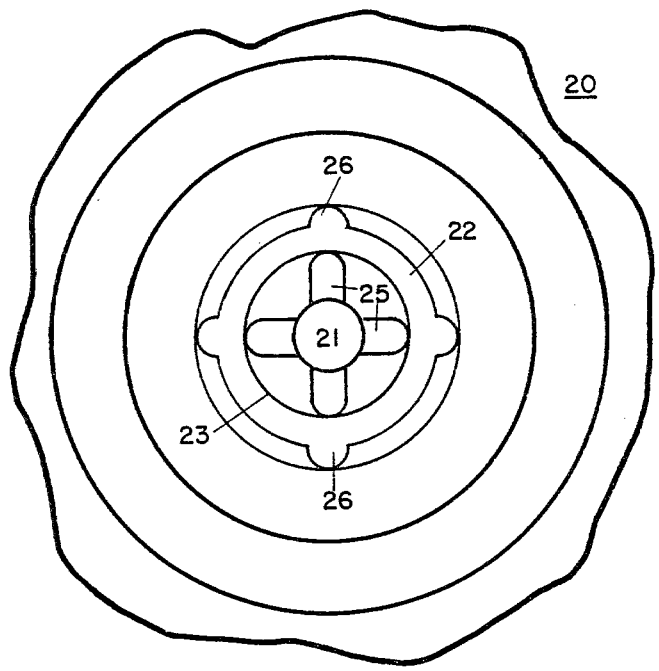
FIG. 3 is an end view of a constituent member of the control valve showing structural channels for reverse operation and the avoidance of control disc distortion.

In addition, the ring seat 22 surrounds a base depression 24 containing the inlet of the channel 21'. The base depression 24 further includes a set of radial channels 25 (more particularly shown in FIG. 3) that insure that the disc 40 will not be pulled into the inlet of the channel, and thus produce undesired distortion and distension of the disc 40. Longitudinal channels 26 are included at the periphery of the control channel 21' to facilitate reverse flow through the valve 10.

Figure 4:
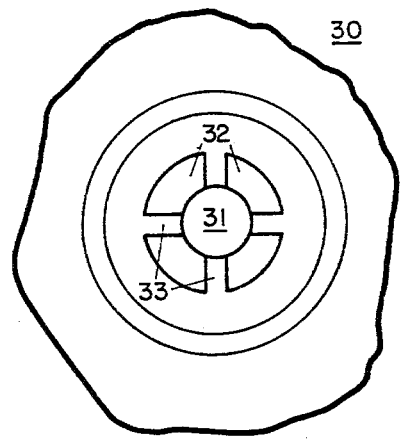
FIG. 4 is an end view of a complementary constituent member of the valve showing an abutment structure for preloading the control disc and facilitating reverse operation.

The disc 40 is prebiased to provide initial seating contact against the ring 22 by prongs 32 of the member 30. These prongs 32, which are illustrated in end view in FIG. 4, are separated by passageways 33 which extend to the outlet channel 31.

It is to be noted that the joinder of the complementary portions 20 and 30 of the body structure 10 can be made in any convenient way along an interface 11. For the particular embodiment of FIG. 2, the interface 11 includes a sealing ring 13, but it will be understood that such a ring is illustrative only and that a wide variety of sealing techniques may be used.

Figure 5:
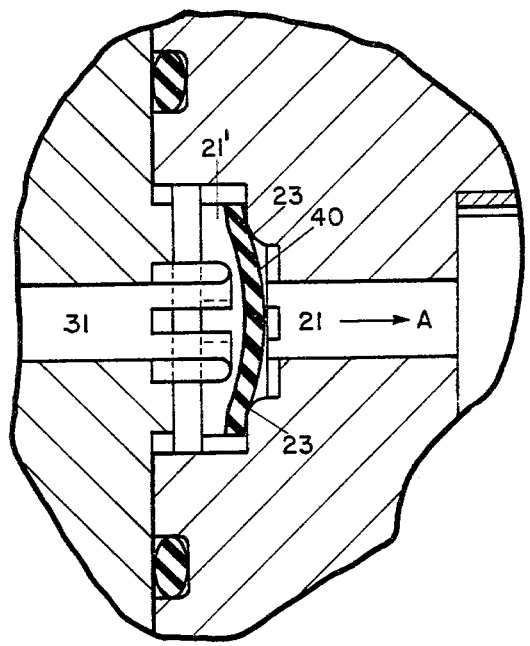
FIG. 5 is a fragmentary view of the structure of FIG. 2 showing the control disc in its closed position to prevent fluid from flowing through the valve.

As shown in FIG. 5, when a differential pressure exits between the channels 21 and 31, with the greater pressure at the channel 31, for example produced by a vacuum applied to the channel 21 in the direction of the arrow A, the disc 40 is drawn away from the prongs 32 into closer contact with the shoulder 23 of the ring seat 22, bringing about the desired closure of the valve 10 and isolation of the channels 21 and 31. Since the sealing surface of the ring 22 is in the form of a convex shoulder 23 that extends circumferentially about the base depression 24, the desired seal is achieved without any adverse effect because of the inadvertent pressence of dirt or debris on the sealing edge 23. This is by contrast with, for example, the sealing surfaces of prior art devices in which the presence of dirt and debris will interfere with the desired closure. In such a case the initial application of sealing pressure does not dislodge the debris, but instead traps it between the disc and the sealing surface. In the case of the present invention, however, any debris on the ring seat tends to be moved away by the appreciable convex curvature 23 of the ring 22, coupled with the interior void formed by the base depression 24.

It is to be noted that because of the radial channels 25 in the base depression 24, the disc 40 cannot be drawn into the inlet channel 21. This avoids the distension of the control disc frequently found in other devices, caused by having the disc sucked into a flow channel.

Figure 6:
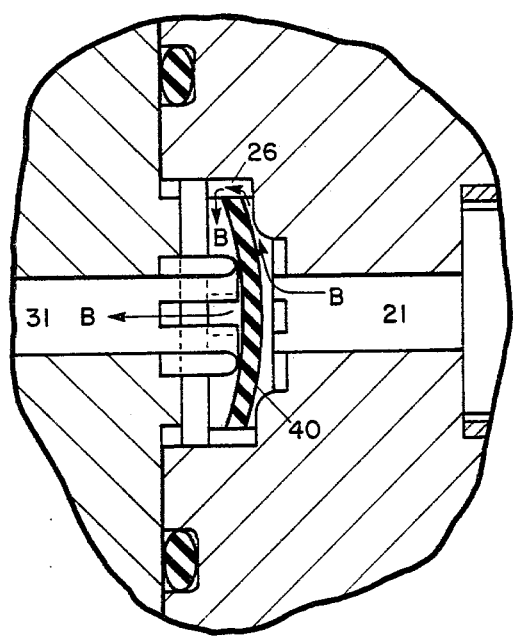
FIG. 6 is a fragmentary view similar to that of FIG. 5 showing the control disc in its open position to permit the passage of fluid through the valve.

The reverse operation of the valve 10 is illustrated in FIG. 6. When the differential pressure that pulls the disc 40 against the shoulder 23 is removed and the flow is reversed, the disc 40 again is positioned against the prongs 32. Flow can now take place in the direction indicated by the arrow B between the ring seat 22 and the edge of the disc 40 through the auxiliary longitudinal channels 26. Because of the channels 26, it is not necessary to reduce the diameter of the disc 40 below that of the control channel 21 in order to permit the desired reverse operation.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A flow control device comprising
a housing;
a flow channel in said housing extending to a control channel which is coaxial therewith;
a valve seat in said control channel surrounding a further flow channel extending from said control channel; and
a flexible disc positioned on said valve seat of said control channel,
said control channel having an inside wall surface extending from said valve seat and interrupted by a plurality of peripheral relief channels; and
means for prebiasing said flexible disc comprising a set of prongs for engaging the central portion of said disc within the opening of said valve seat and being separated by passageways which extend to said flow channel;
said valve seat containing a counterbore which extends into said further flow channel, with at least one counterbore channel which is transverse to the axis of flow to insure that said disc will not be pulled into said further flow channel and produce undesired distortion and distension of said disc.

2. A flow control device in accordance with claim 1 wherein said disc is proportioned to prevent any lateral motion thereof in the absence of flow through said device.

3. A flow control device in accordance with claim 1 wherein said housing is in two separate parts which are joined using an O-ring.

4. A flow control device in accordance with claim 1 wherein said inside wall surface of said control channel is interrupted over a minor portion thereof by said peripheral relief channels.

5. A flow control device in accordance with claim 4 wherein said peripheral relief channels are semicircular in cross section.

6. A flow control device in accordance with claim 5 wherein said peripheral relief channels have their major cross-sectional dimension coincident with said inside wall surface.

7. A flow control device in accordance with claim 1 wherein said inside wall surface is cylindrical.

8. A flow control device in accordance with claim 1 wherein each of said prongs has a trapezoidal cross-section.

9. A flow control device in accordance with claim 8 wherein said trapezoidal cross-section has two linear diverging opposite sides and two arcuate opposite sides.

10. A flow control device in accordance with claim 1 wherein the base of each prong lies within a circumference which is the same as that of said counterbore.

11. A flow control device in accordance with claim 1 wherein said valve seat has a contoured inner shoulder.

* * * * *